Dec. 18, 1956   J. J. HAGOPIAN ET AL   2,774,864
REMOTE CONTROL KEYER

Filed March 27, 1950   3 Sheets-Sheet 1

INVENTORS:
JACOB J. HAGOPIAN
NORMAN MEADOWCROFT
BY Herbert E. Metcalf
THEIR PATENT ATTORNEY Dec. 18, 1956    J. J. HAGOPIAN ET AL    2,774,864
REMOTE CONTROL KEYER
Filed March 27, 1950    3 Sheets-Sheet 2

INVENTORS:
JACOB J. HAGOPIAN
NORMAN MEADOWCROFT
BY Herbert E. Metcalf
THEIR PATENT ATTORNEY Dec. 18, 1956    J. J. HAGOPIAN ET AL    2,774,864
REMOTE CONTROL KEYER Filed March 27, 1950    3 Sheets-Sheet 3

INVENTORS:
JACOB J. HAGOPIAN
NORMAN MEADOWCROFT
BY Herbert E. Metcalf
THEIR PATENT ATTORNEY

United States Patent Office 2,774,864
Patented Dec. 18, 1956

2,774,864

REMOTE CONTROL KEYER

Jacob J. Hagopian, Los Angeles, and Norman Meadowcroft, Santa Monica, Calif., assignors to Northrop Aircraft, Inc., Hawthorne, Calif., a corporation of California Application March 27, 1950, Serial No. 152,042

28 Claims. (Cl. 250—2)

This invention relates to switch actuating mechanisms, and more particularly, to a control unit wherein the rotation of a knob in one direction produces on-off operations of an electrical switch.

In electrical circuits where series of intermittent open and closed conditions, or pulses, are required for remote radio control, a manual toggle switch is usually operated on and off a given number of times. This results in an excessive and sometimes uncertain number of operations, so that it is desirable to simplify the controls. An example of such a situation is a remote radio control system where several of these circuits are in simultaneous use, and the present invention is particularly adapted to a device for use as a radio control keying unit for an automatically guided aircraft.

An object of this invention is to provide a unit in which electrical control pulses are obtained by the simple rotation of a calibrated knob in one direction, the number of pulses being proportional to the angle of rotation, and in which similar pulses are obtained by knob rotation in the opposite direction to restore the system to the original condition.

In remote radio control systems, for example, there is a certain maximum rate at which the control switches can be operated through the on and off cycles for accurate response. It is another object of the present invention to provide a rotation-controlled intermittent switching means wherein the maximum speed of rotation is limited to a predetermined value.

In order to further insure that the position or attitude of the remotely controlled object will agree with the indicated condition on the control unit, it is still another object to provide automatic means operated by the control unit to synchronize the control unit with the controlled system at some desired reference position.

Other objects and advantages will be apparent from the detailed description of specific apparatus to follow. Briefly, our invention comprises a calibrated dial and knob connected to revolve a toothed member, pivoted follower means arranged to be displaced and returned to neutral by the teeth when the knob and member are turned, one switching means connected to the follower to be closed and opened by this cyclic displacement as a result of knob rotation in one direction, and a second switching means connected to be similarly closed and opened as a result of opposite rotation. The switching means are to be wired in circuits so that electrical pulses are produced by each switching means in its respective circuit. A gear train turning a centrifugal brake determines the maximum speed of knob rotation so that the produced pulses will have a predetermined maximum frequency and minimum width. In addition, a third switching means is operated whenever the knob reaches a calibrated zero position, to produce a reference signal for synchronization of the zero knob position with the corresponding position of the controlled device.

This invention will be more fully understood by reference to the accompanying drawings, shown by way of illustration and not limitation, wherein.

Figure 1:
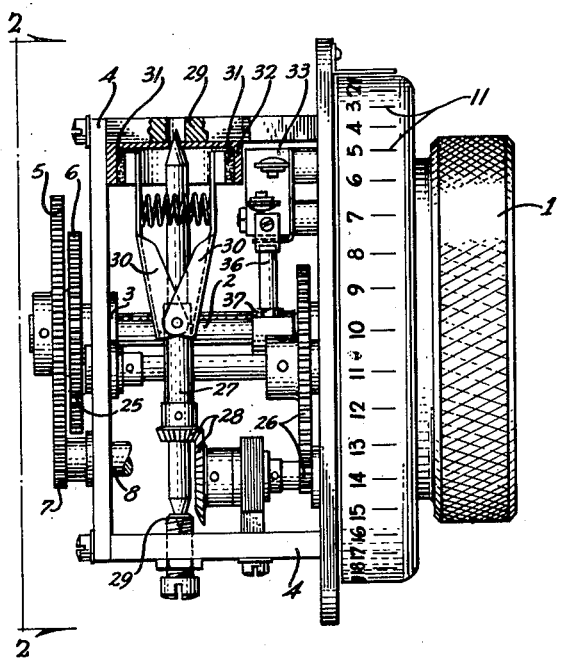
Figure 1 is a longitudinal elevation view of one switch control unit, showing a control knob and centrifugal brake.
Figure 2:
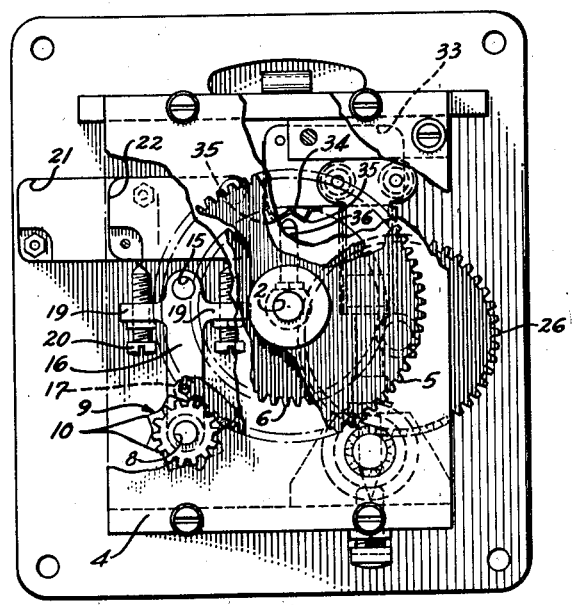
Figure 2 is a left end elevation view of the unit in Figure 1, showing the relation of various control switch parts, while omitting some of the brake configuration.

Referring first to Figures 1 and 2 for a detailed description of the basic control unit, a control knob 1 is mounted on the end of a drive axle 2 supported by bushings 3 in a housing 4. A large drive gear 5 and a small drive gear 6 are fixed to the other end of the drive axle 2. The large drive gear 5 meshes with a star wheel pinion 7 on a switch shaft 8 also carried in the housing 4. A star wheel 9, connected to rotate with the pinion 7, has eight points 10. Calibrations 11 on the control knob 1 and the ratio of the gearing to the star wheel 9 provide for a displacement of one wheel point 10 for each calibration mark on the knob. Incremental movements of the assembly equal to one calibration mark 11 are provided by a spring-loaded ball 12 riding on a notched wheel 14 which turns with the knob 1 (Figure 3).

Figure 3:
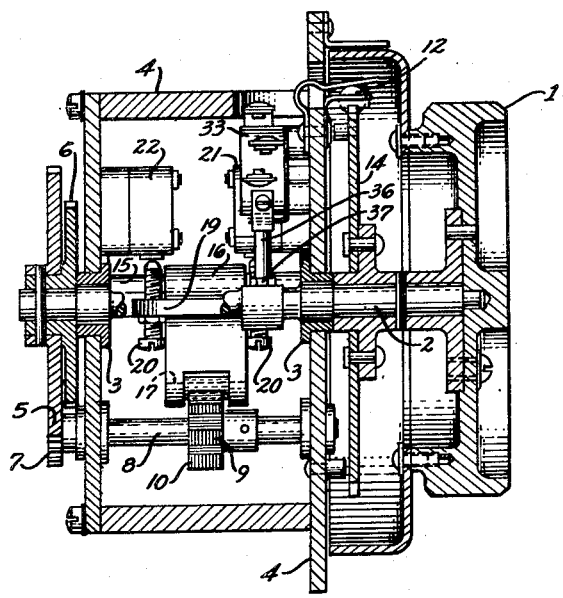
Figure 3 is a longitudinal section view, taken as indicated by the line 3—3 in Figure 2, showing the control switch shaft and knob detents.

As further shown in Figure 3, a toggle shaft 15, parallel to the switch shaft 8, forms a rotational axis for a toggle 16 having a follower 17 which rests in the space between two star points 10 when the toggle 16 is in its center position. Two opposite legs 19 on the toggle 16 are provided with adjustably extending screws 20 positioned to operate the respective actuating plungers of two momentary-contact snap control switches 21 and 22 which are normally open and fixed to the housing 4. Thus, when the control knob 1 is turned one notch, the star wheel 9, in shifting one point, will deflect the toggle 16 far enough to make one screw contact and close one of the control switches 21, and then the toggle 16 will spring back to its center position between star wheel points, allowing the control switch to open again. This operation repeats itself when the knob 1 is turned farther in the same direction. When knob motion is reversed, the toggle 16 is deflected in the opposite direction to actuate the other control switch 22 in the same manner.

To limit the speed with which the control knob 1 may be turned, a braking device is provided, as shown in Figure 1. Here, the small drive gear 6 on the drive axle 2 meshes with an intermediate pinion 25 connected to rotate additional step-up gearing 26 which in turn drives a governor shaft 27 through stepped-up bevel gears 28. The governor shaft 27 rotates between needle bearing end supports 29 in the housing 4, in a vertical position, and carries spring-loaded governor arms 30 having braking surfaces 31 at their outer ends. When the governor arms 30 swing outwardly with increased shaft speed, the surfaces 31 come into frictional contact with the inside of a circular brake drum 32, thus resisting the rotational force to keep the speed below a certain maximum value. Control knob to governor shaft ratio is about 100 to one in this particular embodiment.

At a certain neutral reference position of this control unit, numbered zero on the control knob indicator, a third switch is designed to be operated. This is a synchronizing switch 33 of the same type as the control switches 21 and 22, but having an adapter 34 with two projections 35 facing toward the drive axle 2. A finger 36, threaded into a section of the axle 2 and held by a lock nut 37, rests between the projections 35 at the zero position of the control knob 1 similar to the toggle follower 17 at the star wheel 9. The arrangement is such that when the knob 1 reaches the zero position from the first position on either side of zero, the finger 36 will pass over and displace one of the adapter projections 35 to actuate the synchronizing switch 33 through one on-off cycle. At all other knob positions, the synchronizing switch is unactuated, and its function will be discussed later.

Figure 4:
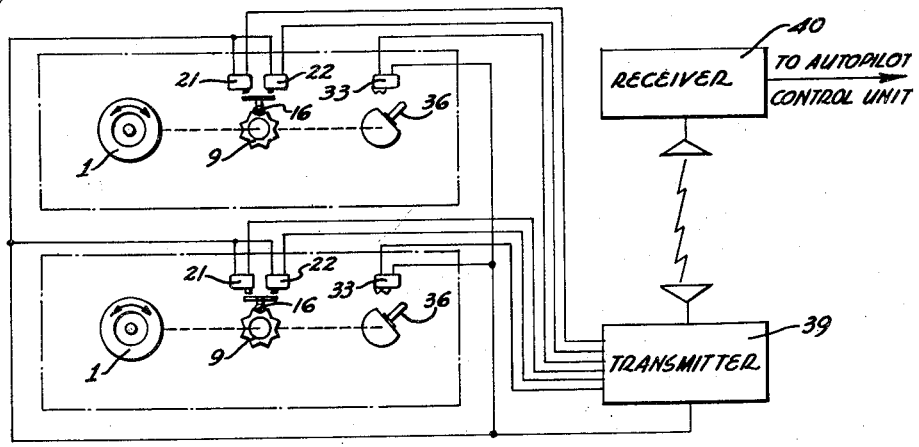
Figure 4 is a diagrammatic view showing electrical connections of two switch control units in a remote radio control system.

For remote radio control of a tailless aircraft, for example, three of the above-described control units may be employed; one for throttle control, one for bank control, and one for pitch control. Two or more units are connected electrically as illustrated in Figure 4. A transmitter 39 having several available audio frequency channels is provided, each of the several switches having an ouput into one of these channels. A receiver 40 tuned to the transmitter carrier frequency and a selector unit comprise a decoder which gives voltage signals to the proper auto-pilot control units.

The circuits are so connected that the zero position of each control knob 1 corresponds with a given reference position of the controlled surface, so that clockwise knob rotation from zero results in a right turn, for example, while counterclockwise rotation of the same knob from the zero position results in a left turn. The control switches of other control units are similarly paired. When turned to the zero position, synchronizing switch action of each control unit causes an "indexing" pulse signal to be transmitted in the modulation channel allotted to be controlled by the particular synchronizing switch so operated, which energizes a neutralizing circuit in the controlled device to drive the associated surface to its reference or index position regardless of the loss of a control pulse or the addition of a false pulse signal during a change of control angle.

Depending on the type of control circuit in which the synchronizing switch 33 is connected, the two projections 35 on the synchronizing switch adapter 34 may not be necessary. If the desired indexing signal will be produced by merely closing a switch instead of requiring a complete close-open cycle, a single-point adapter can be substituted for the one with the two projections. This single-point adapter would be contacted by the finger 36 to provide a constant "circuit closed" condition of the synchronizing switch during the entire time the control knob 1 is in the zero position. This latter method will enable an indicator light to be operated whenever the controls are in the index position, if desired.

Figure 5:
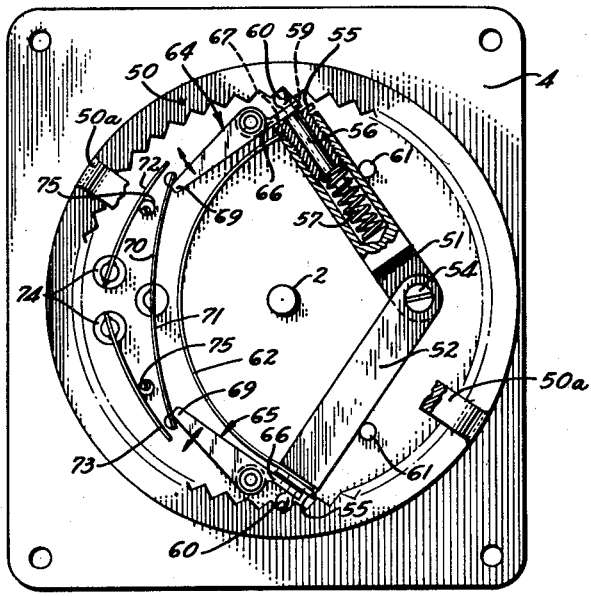
Figure 5 is a partial end view showing an alternate control switching means of the present invention.

It will also be noted that, while certain means have been disclosed hereinbefore to provide open or closed circuits, other actuating means may be substituted in their place, such as the design shown in Figure 5. In this embodiment, the former star wheel, associated gearing, toggle, and snap control switches are replaced by other, equivalent, parts. An internally toothed ring 50 is attached to be rotated by the drive axle 2 and control knob 1, as by ring braces 50a, or non-rigidly by a relatively stiff torsion spring (not shown). Two arms 51 and 52 are each pivoted at one end to a common pivot pin 54 attached in the housing 4. Each arm 51 and 52 carries an adjustable bushing 55 in which a plunger 56 slides, the plunger being elastically forced to an outermost position by a plunger spring 57 mounted in the arm.

At the outer end of each arm, each plunger 56 has a neck portion 59 and a spherical end 60 larger than the neck. The spherical ends 60 are pushed outwardly by the plunger springs 57 and contact the teeth of the toothed ring 50 at diametrically opposite points which are equidistant from the pivot pin 54. A stop 61 is provided for each arm 51 and 52 to prevent pivoting of either arm past the stop position in the direction increasing the included angle between the arms 51 and 52, and a curved leaf spring 62 bears against each arm assembly near the outer end to tend to retain each arm against its respective stop 61.

A pair of switch actuating links 64 and 65 are pivoted in the housing 4 at substantially opposite positions just inside the toothed ring 50. A short leg 66 of each actuating link contains a slot 67 fitting around the neck 59 of each respective plunger 56. The slot 67 is too narrow to permit passage of the spherical end 60.

A long leg 69 of each link 64 and 65 bears respectively against one of two conductive switch contact springs 70 and 71 which are associated with upper and lower conductive switch blades 72 and 73 respectively. The two switch blades 72 and 73 are electrically connected to separate terminals insulated from the housing 4 by insulated bushings 74, while the switch contact springs 70 and 71 and actuating links 64 and 65 are electrically connected to the housing 4. A stud 75 having an eccentric head is used to adjust the position of each switch blade 72 and 73, and to act as a snubber for these blades.

In any calibrated position of the control knob 1, the spherical ends 60 of the plungers 56 are both resting in a tooth detent with the necks 59 at the outer ends of the slots 67 and the switch contact springs 70 and 71 assume positions not touching the switch blades 72 and 73, as shown in Figure 5.

In operation, considering the upper arm and link in Figure 5, when the toothed ring 50 is rotated clockwise, the plunger 56 is depressed, since the arm 51 is resting against the stop 61 and cannot be moved to the right. The plunger 56, in being depressed against the plunger spring 57, carries with it the short leg 66 of the actuating link 64, thus causing the long leg 69 to swing upwardly and bring the switch contact spring 70 into contact with the switch blade 72. After the spherical end 60 has passed the peak of the tooth, it drops into the next tooth space and lets the switch contacts spring open. One pulse has thus been obtained through the upper switch blade 72.

When the toothed ring 50 is rotated counterclockwise, the upper plunger 56 is not depressed but is moved to the left, carrying the arm 51 with it. The neck 59 of the upper plunger 56 slides along the slot 67 without giving any motion to the link 64. After this plunger has passed the tooth peak, it drops back to the right under the action of the curved leaf spring 62. Therefore, counterclockwise knob rotation does not perform any switching operation at the upper switch blade 72.

The action of the lower arm 52 and link 65 is the opposite of the above; that is, a clockwise rotation of the toothed ring 50 causes arm displacement only, while a counterclockwise rotation causes contact of the lower switch blade 73 and contact spring 71 for one pulse output per tooth.

In employing this alternate form of contact-making, synchronizing switch operation and construction may be the same as described previously, with the finger 36 on the drive axle 2 providing the actuating means at the index position only. The brake configuration may also be included in the alternate design with no change, if desired.

Some obvious advantages of this second embodiment are improved switching adjustments, easier manual operation of control knob, elimination of gearing between knob and star wheel, and elimination of backlash problems tending to leave one of the control switches closed when the control knob 1 stops in a detent position.

Thus it is seen that, with the present invention, the member or device moved by manipulation of each control unit is maintained in accurate correspondence with the positions occupied by its control unit. The calibrations on the knobs are a constant indication of the attitude of the controlled object. The necessary number of control units may be mounted in a single box and connected by cable to the transmitter 39 and power supply.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A switch controller comprising a rotatable knob, a star wheel connected to be rotated by said knob, a toggle pivotally mounted in the same plane of rotation as said star wheel, a wheel follower attached to said toggle, said follower being located between two adjacent wheel points and on a straight line between the pivot of said toggle and the rotational center of said wheel when said toggle is in a central position, two oppositely extending rocker arms formed on said toggle, a pair of spring-loaded on-off switching means each having an adjustable actuator positioned adjacent and in the path of motion of one of said rocker arms, respectively, when said star wheel is rotated in either direction, one of said rocker arms thereby operating one only of said switch actuators through one on-off cycle of its respective switching means for each one-point rotation of said star wheel in one direction, and the other of said rocker arms thereby operating the other only of said switch actuators through one on-off cycle of its respective switching means for each one-point rotation of said star wheel in the opposite direction.

2. Apparatus in accordance with claim 1 including a centrifugal brake connected to be rotated proportionately with said star wheel, whereby the maximum rate of switch operation is limited.

3. Apparatus in accordance with claim 1 wherein said knob is calibrated in units of angular displacement corresponding to every one-point rotation of said star wheel, and including intermittent rotation resistance means adapted to impart incremental movements to said knob equal to said calibration units.

4. A switch controller comprising a rotatable knob, a star wheel connected to be rotated by said knob, a toggle pivotally mounted in the same plane of rotation as said star wheel, a wheel follower attached to said toggle and located between two adjacent wheel points when said toggle is in a central position, a double-sided rocker arm on said toggle, a pair of spring-loaded on-off switching means each having an adjustable actuator positioned in operating line with opposite sides of said rocker arm, said rocker arm sides being respectively positioned to contact and operate one only of said switch actuators through one on-off cycle of its respective switching means for each one-point rotation of said star wheel in one direction, and to contact and operate the other only of said switch actuators through one on-off cycle of its respective switching means for each one-point rotation of said star wheel in the opposite direction, said knob being calibrated in units of angular displacement corresponding to every one-point rotation of said star wheel, intermittent rotation resistance means adapted to impart incremental movements to said knob equal to said calibration units, an index position included among said knob calibrations, and including third on-off switching means with an actuator, and means for contacting and operating the actuator of said third switching means at said index position only.

5. A switch controller comprising a rotatable knob, a star wheel connected to be rotated by said knob, a toggle pivotally mounted in the same plane of rotation as said star wheel, a wheel follower attached to said toggle and located between two adjacent wheel points when said toggle is in a central position, a double-sided rocker arm on said toggle, a pair of spring-loaded on-off switching means each having an adjustable actuator positioned in operating line with opposite sides of said rocker arm, said rocker arm sides being respectively positioned to contact and operate one only of said switch actuators through one on-off cycle of its respective switching means for each one-point rotation of said star wheel in one direction, and to contact and operate the other only of said switch actuators through one on-off cycle of its respective switching means for each one-point rotation of said star wheel in the opposite direction, said knob being calibrated in units of angular displacement corresponding to every one-point rotation of said star wheel, intermittent rotation resistance means adapted to impart incremental movements to said knob equal to said calibration units, an index position included among said knob calibrations, and including third on-off switching means with an actuator, and an actuator contact finger rotatable integrally with said knob, said finger being aligned to contact and operate the actuator of said third switching means when switched to said index position only.

6. In a remote radio control system including a transmitter with two different modulation channels for radiating electrical control pulses, a control unit comprising a rotatable star wheel, a toggle pivotally mounted in the same plane of rotation as said star wheel, a wheel follower mounted on said toggle and located between two adjacent wheel points when said toggle is in a central position, two oppositely extending rocker arms formed on said toggle, a pair of spring-loaded on-off switching means each having an actuator positioned in the path of motion of one of said rocker arms, respectively, when said star wheel is rotated in either direction, one of said rocker arms thereby operating one only of said switch actuators through one on-off cycle of its respective switching means for each one-point rotation of said star wheel in one direction, and the other of said rocker arms thereby operating the other only of said switch actuators through one on-off cycle of its respective switching means for each one-point rotation of said star wheel in the opposite direction, one of said switching means electrically connected to control the number of output pulses from one of said modulation channels, and the other switching means electrically connected to control the number of output pulses from the other channel.

7. Apparatus in accordance with claim 6 including a manually operable control member connected to rotate said star wheel, position indications for said member comprising calibrations in units of angular displacement corresponding to every one-point rotation of said star wheel, and intermittent rotation resistance means adapted to impart incremental movements to said member equal to said calibration units.

8. Apparatus in accordance with claim 6 including a centrifugal brake connected to be rotated proportionately with said star wheel, whereby the maximum frequency of said output pulses is limited.

9. In a remote radio control system including a transmitter with three different modulation channels for radiating electrical control pulses, a control unit comprising a rotatable star wheel, a toggle pivotally mounted in the same plane of rotation as said star wheel and having a wheel follower located between two adjacent wheel points when said toggle is in a non-actuating position, a double-sided rocker arm on said toggle, a pair of spring-loaded on-off control switching means each having an actuator positioned in operating line with opposite sides of said rocker arm, said rocker arm sides being respectively positioned to contact and operate one only of said control switch actuators through one on-off cycle of its respective control switching means for each one-point rotation of said star wheel in one direction, and to contact and operate the other only of said control switch actuators through one on-off cycle of its respective control switching means for each one-point rotation of said star wheel in the opposite direction, one of said control switching means electrically connected to control the number of output pulses from one of said modulation channels, the other control switching means electrically connected to control the number of output pulses from the second of said channels, said control unit having a neutral index position, synchronizing on-off switching means electrically connected to produce a predetermined output from the third of said channels, and means for contacting and operating said synchronizing switching means at said index position only.

10. Apparatus in accordance with claim 9 including a manually operable control member connected to rotate said star wheel, and position indications for said member comprising calibrations in units of angular displacement from each side of said index position corresponding to every one-point rotation of said star wheel.

11. In a remote radio control system for a guided craft including a transmitter with a plurality of different modulation channels for radiating electrical control pulses, a plurality of control units each comprising a rotatable star wheel, a toggle pivotally mounted in the same plane of rotation as said star wheel and having a wheel follower located between two adjacent wheel points when said toggle is in a central position, a double-side rocker arm on said toggle, a pair of spring-loaded on-off switching means each having an actuator positioned in operating line with opposite sides of said rocker arm, said rocker arm sides being respectively positioned to contact and operate one, only, of said switch actuators through one on-off cycle of its respective switching means for each one-point rotation of said star wheel in one direction, and to contact and operate the other, only, of said switch actuators through one on-off cycle of its respective switching means for each one-point rotation of said star wheel in the opposite direction, the two switching means of each of said control units connected in control circuits for movement of a single functional component in said craft in two opposite senses.

12. In a remote radio control system for a guided craft including a transmitter with a plurality of different modulation channels for radiating electrical control pulses, a plurality of control units each constructed and connected in accordance with claim 9, the two control switching means in each of said control units connected in modulation circuits for movement of a single functional component in said craft in opposite respective senses, and the synchronizing switching means in each of said control units connected in separate modulation circuits for bringing to a reference position its respective component at said index position of said control unit regardless of any error between component position and control unit indication before switching to said index position.

13. A switch controller comprising a rotatable internally toothed ring, a pair of arms mounted on fixed off-center pivots within said ring to pivot in the plane of rotation of said ring, a plunger projecting from the outer end of each of said arms and elastically urged to an outermost position, each of said plungers having a head portion normally abutting the interior of said ring in a tooth space while at said outermost position, with the pivotal radii of said plungers and arms intersecting the toothed interior surface of said ring at angles somewhat less than 45 degrees from the normal, and from opposite respective directions to provide a ratchet-like action such that rotation of said ring in one direction depresses one of said plungers from its normal position in its respective arm against its elastic urge once for each ring tooth increment and turns the other arm from its normal position about its pivot without depressing its respective plunger, and vice versa, arm stop means fixed to prevent pivoting of each of said arms beyond said normal positions in the direction tending to result from ring rotation causing plunger depression, elastic return means connected to return each of said arms to its respective normal position after being turned by ring rotation, as recited, for an angular distance of one tooth space, a neck portion on each plunger adjacent said head portion, a pivoted actuating link associated with each of said plungers, means defining a slot in said actuating link surrounding said neck but not passable over said head, said slot aligned to allow arm turning, as recited, without actuating said link and positioned to allow actuation of said link about its pivot when its associated plunger is depressed by said teeth, and separate adjustable switch contact means arranged to be closed and opened by the pivotal oscillation of each of said links when actuated back and forth by its respective plunger.

14. Apparatus in accordance with claim 13 wherein each of said switch contact means comprises a flexible contact leaf adapted to be displaced in response to pivoting of one of said links, and a switch blade positioned to be contacted by said leaf when displaced.

15. A switch controller comprising a rotatable internally toothed ring, a pair of arms mounted on fixed off-center pivots within said ring to pivot in the plane of rotation of said ring, a plunger projecting from the outer end of each of said arms and elastically urged to an outermost position, each of said plungers having a head portion normally abutting the interior of said ring in a tooth space while at said outermost position, with the pivotal radii of said plungers and arms intersecting the toothed interior surface of said ring at angles somewhat less than 45 degrees from the normal, and from opposite respective directions to provide a ratchet-like action such that rotation of said ring in one direction depresses one of said plungers from its normal position in its respective arm against its elastic urge once for each ring tooth increment and turns the other arm from its normal position about its pivot without depressing its respective plunger, and vice versa, arm stop means fixed to prevent pivoting of each of said arms beyond said normal positions in the direction tending to result from ring rotation causing plunger depression, elastic return means connected to return each of said arms to its respective normal position after being turned by ring rotation, as recited, for an angular distance of one tooth space, and on-off switching means connected to be actuated in response to the in and out movements of each of said plungers.

16. Apparatus in accordance with claim 15 wherein a control knob is connected to impart rotation to said toothed ring, said knob being calibrated in units of angular displacement corresponding to every one-tooth rotation of said ring.

17. Apparatus in accordance with claim 16 wherein an index position is included among said knob calibrations, and including a third on-off switching means and means for operating said third switching means at said index position only.

18. In a remote radio control system including a transmitter with two different modulation channels for radiating electrical control pulses, a control unit comprising a rotatable internally toothed ring, a pair of arms mounted on fixed off-center pivots within said ring to pivot in the plane of rotation of said ring, a plunger projecting from the outer end of each of said arms and elastically urged to an outermost position, each of said plungers having a head portion normally abutting the interior of said ring in a tooth space while at said outermost position, with the pivotal radii of said plungers and arms intersecting the toothed interior surface of said ring at angles somewhat less than 45 degrees from the normal, and from opposite respective directions to provide a ratchet-like action such that rotation of said ring in one direction depresses one of said plungers from its normal position in its respective arm against its elastic urge once for each ring tooth increment and turns the other arm from its normal position about its pivot without depressing its respective plunger, and vice versa, arm stop means fixed to prevent pivoting of each of said arms beyond said normal positions in the direction tending to result from ring rotation causing plunger depression, elastic return means connected to return each of said arms to its respective normal position after being turned by ring rotation, as recited, for an angular distance of one tooth space, and on-off switching means connected to be actuated in response to the in and out movements of each of said plungers, one of said switching means electrically connected to control the number of output pulses from one of said modulation channels, and the other switching means electrically connected to control the number of output pulses from the other channel.

19. A switch controller comprising a rotatable toothed member, follower means independently mounted on a single common pivot and positioned in operating contact with the teeth of said toothed member to be displaced in one direction about said pivot and returned to normal by ratchet action of said teeth and follower means when said member is rotated in one direction, and similarly displaced in an opposite direction when said member is rotated in the other direction, a pair of on-off switching means each having two spaced contacts, adjustable first switch actuating means driven by said follower means to close and open the two contacts of one only of said pair of switching means in response to each displacement in said one direction, and adjustable second switch actuating means driven by said follower means to close and open the two contacts of the other switching means only, in response to each of said opposite direction displacements.

20. Apparatus in accordance with claim 19 including a centrifugal brake connected to be rotated proportionately with said rotatable member, whereby the maximum speed of the switching operations is limited.

21. Apparatus in accordance with claim 19 wherein a control knob is connected to impart rotation to said toothed member, said knob being calibrated in units of angular displacement corresponding to every one-tooth rotation of said member.

22. A switch controller comprising a rotatable toothed member, pivoted follower means positioned in operating contact with the teeth of said toothed member to be displaced in one sense and returned to normal by ratchet action of said teeth and follower means when said member is rotated in one direction, and similarly displaced in an opposite sense when said member is rotated in the other direction, a pair of on-off switching means, adjustable first switch actuating means driven by said follower means to close and open one, only, of said pair of switching means in response to each displacement in one sense, adjustable second switch actuating means driven by said follower means to close and open the other switching means only, in response to each of said opposite sense displacements, a control knob connected to impart rotation to said toothed member, said knob being calibrated in units of angular displacement corresponding to every one-tooth rotation of said member, an index position included among said knob calibrations, and including a third on-off switching means and means for operating said third switching means at said index position only.

23. A switch controller comprising a rotatable toothed member, pivoted follower means positioned in operating contact with the teeth of said toothed member to be displaced in one sense and returned to normal by ratchet action of said teeth and follower means when said member is rotated in one direction, and similarly displaced in an opposite sense when said member is rotated in the other direction, a pair of on-off switching means, adjustable first switch actuating means driven by said follower means to close and open one, only, of said pair of switching means in response to each displacement in one sense, adjustable second switch actuating means driven by said follower means to close and open the other switching means only, in response to each of said opposite sense displacements, a control knob connected to impart rotation to said toothed member, said knob being calibrated in units of angular displacement corresponding to every one-tooth rotation of said member, an index position included among said knob calibrations, and including third on-off switching means with an actuator, and an actuator contact finger rotatable integrally with said knob, said finger being aligned to contact and operate the actuator of said third switching means when switched to said index position only.

24. In a remote radio control system including a transmitter with two different modulation channels for radiating electrical control pulses, a control unit comprising a rotatable toothed member, follower means mounted on a single common pivot and positioned in operating contact with the teeth of said toothed member to be displaced in one direction about said pivot and returned to normal by ratchet action of said teeth and follower means when said member is rotated in one direction, and similarly displaced in an opposite direction when said member is rotated in the other direction, a pair of on-off switching means each having two spaced contacts, first switch actuating means driven by said follower means to close and open one only of said pair of switching means in response to each displacement in said one direction, and second switch actuating means driven by said follower means to close and open the other switching means only, in response to each of said opposite direction displacements, one of said switching means electrically connected to control the number of output pulses from one of said modulation channels, and the other switching means electrically connected to control the number of output pulses from the other channel.

25. Apparatus in accordance with claim 24 including a manually operable control member connected to rotate said toothed member, position indications for said control member comprising calibrations in units of angular displacement corresponding to every one-tooth rotation of said toothed member, and intermittent rotation resistance means adapted to impart incremental movements to said control member equal to said calibration units.

26. In a remote radio control system including a transmitter with three different modulation channels for radiating electrical control pulses, a control unit comprising a rotatable toothed member, pivoted follower means positioned in operating contact with the teeth of said toothed member to be displaced in one sense and returned to normal by ratchet action of said teeth and follower means when said member is rotated in one direction, and similarly displaced in an opposite sense when said member is rotated in the other direction, a pair of on-off control switching means, first switch actuating means driven by said follower means to close and open one only of said pair of control switching means in response to each displacement in said one sense, second switch actuating means driven by said follower means to close and open the other control switching means only, in response to each of said opposite sense displacements, one of said control switching means electrically connected to control the number of output pulses from one of said modulation channels, the other control switching means electrically connected to control the number of output pulses from the second of said channels, said control unit having a neutral index position, synchronizing on-off switching means electrically connected to produce a predetermined output from the third of said channels, and means for contacting and operating said synchronizing switching means at said index position only.

27. In a remote radio control system for a guided craft including a transmitter with a plurality of different modulation channels for radiating electrical control pulses, a plurality of control units each comprising a rotatable toothed member, pivoted follower means positioned in operating contact with the teeth of said toothed member to be displaced in one sense and returned to normal by ratchet action of said teeth and follower means when said member is rotated in one direction, and similarly displaced in an opposite sense when said member is rotated in the other direction, a pair of on-off switching means, first switch actuating means driven by said follower means to close and open one, only, of said pair of switching means in response to each displacement in said one sense, and second switch actuating means driven by said follower means to close and open the other switching means only, in response to each of said opposite sense displacements, said pair of switching means of each of said control units connected in control circuits for movement of a single functional component in said craft in two opposite senses.

28. In a remote radio control system for a guided craft including a transmitter with a plurality of different modulation channels for radiating electrical control pulses, a plurality of control units each constructed and connected in accordance with claim 26, the two control switching means in each of said control units connected in modulation circuits for movement of a single functional component in said craft in opposite respective senses, and the synchronizing switching means in each of said control units connected in separate modulation circuits for bringing to a reference position its respective component at said index position of said control unit regardless of any error between component position and control unit indication before switching to said index position.

References Cited in the file of this patent

UNITED STATES PATENTS

| | | |
|---|---|---|
| 733,626 | Cory | July 14, 1903 |
| 970,592 | Ybarrondo | Sept. 20, 1910 |
| 1,508,414 | Scott | Sept. 16, 1924 |
| 1,851,498 | Doane | Mar. 29, 1932 |
| 1,899,151 | Hokanson et al. | Feb. 28, 1933 |
| 2,388,748 | Kopetzky | Nov. 13, 1945 |
| 2,397,477 | Kellogg | Apr. 2, 1946 |
| 2,420,693 | White | May 20, 1947 |
| 2,507,140 | Bule | May 9, 1950 |
| 2,580,453 | Murray et al. | Jan. 1, 1952 |